United States Patent [19]

Hoopengardner

[11] Patent Number: 4,990,399
[45] Date of Patent: Feb. 5, 1991

[54] CARPET CUSHION WITH ADHESIVE

[75] Inventor: Merle R. Hoopengardner, Lafayette, Calif.

[73] Assignee: Step Loc Corporation, Lafayette, Calif.

[21] Appl. No.: 457,961

[22] Filed: Dec. 27, 1989

Related U.S. Application Data

[63] Continuation-in-part of Ser. No. 243,606, Sep. 13, 1988, which is a continuation-in-part of Ser. No. 147,214, Jan. 22, 1988, abandoned, which is a continuation-in-part of Ser. No. 882,173, Jul. 7, 1986, Pat. No. 4,797,170.

[51] Int. Cl.$^5$ .................. B32B 7/12; D04H 11/00
[52] U.S. Cl. .................. 428/317.3; 428/317.7; 428/343; 428/95
[58] Field of Search .................. 428/317.3, 317.7, 95, 428/343

[56] References Cited

U.S. PATENT DOCUMENTS

| | | | |
|---|---|---|---|
| 4,172,917 | 10/1979 | Angelle et al. | 428/95 |
| 4,234,649 | 11/1980 | Ward | 428/255 |
| 4,405,668 | 9/1983 | Wald | 428/247 X |
| 4,557,774 | 12/1985 | Hoopengardner | 428/354 X |
| 4,647,484 | 3/1987 | Higgins | 428/95 X |
| 4,797,170 | 1/1989 | Hoopengardner | 428/317.3 X |
| 4,824,498 | 4/1989 | Goodwin et al. | 428/95 X |
| 4,853,280 | 8/1989 | Poteet | 428/317.3 X |

*Primary Examiner*—George F. Lesmes
*Assistant Examiner*—D. R. Zirker
*Attorney, Agent, or Firm*—Thomas M. Freiburger

[57] ABSTRACT

A carpet cushion of compressible materials such as urethane foam, natural fibers or felt material has a pressure sensitive adhesive pre-coated on only one side, preferably the side which will be adhered down to a floor. A scrim webbing or other spacer element is laid into the pressure sensitive adhesive after the adhesive has been applied. The spacer element enables the movement of the carpet cushion around on the floor for positioning prior to sticking down to the floor, and when the cushion is rolled for storage and shipment, the spacer element enables the cushion to be rolled without any release film between the rolled layers. In the rolled form of the cushion, the spacer element or scrim webbing prevents the adhesive from strongly adhering to the adjacent opposite surface of the cushion in the roll.

10 Claims, 1 Drawing Sheet

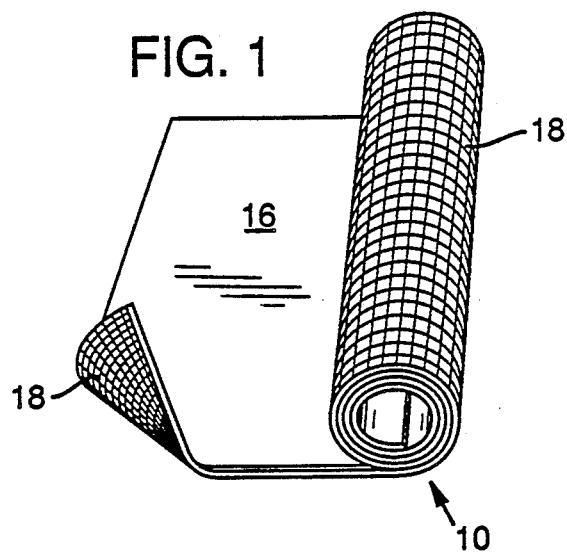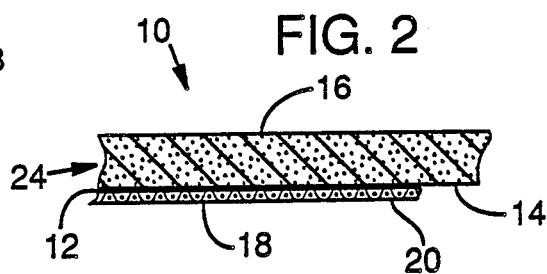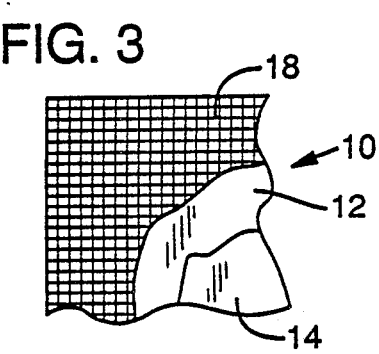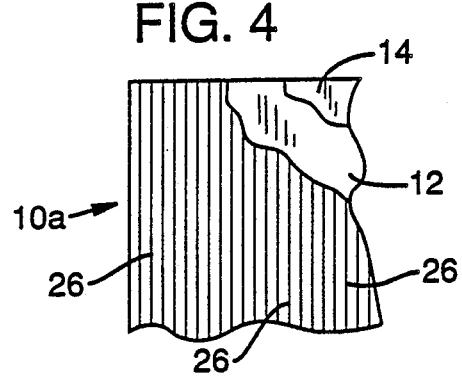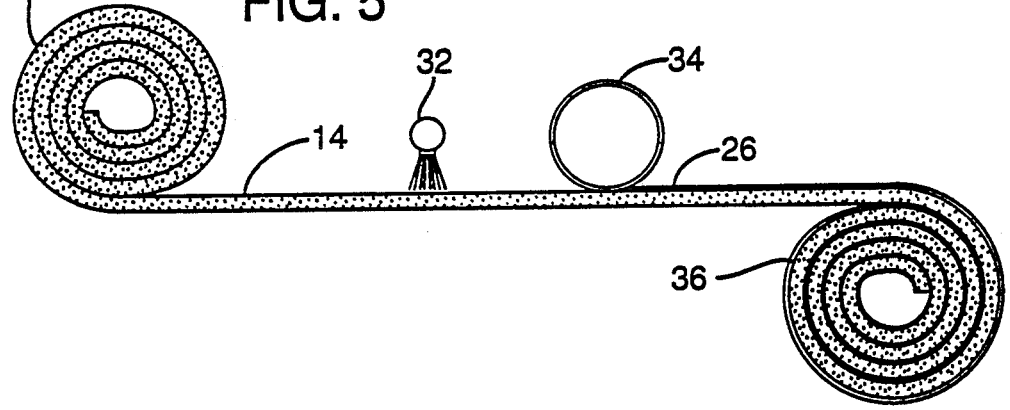

CARPET CUSHION WITH ADHESIVE

REFERENCE TO RELATED APPLICATIONS

This application is a continuation,-in-part of copending application Ser. No. 243,606, filed 09/13/88 which was a continuation-inpart of applications Ser. Nos. 147,214 filed 01/22/88 (now abandoned) and 882,173 (now U.S. Pat. No. 4,797,170).

BACKGROUND OF THE INVENTION

This invention relates generally to wall-to-wall carpeting. More particularly, the invention is concerned with an improvement in pressure sensitive adhesive carpet cushion and carpet laying systems, wherein the adhesive carpet cushion is made more cost effective and efficient in use.

A wall-to-wall carpet laying system developed by the present applicant and known by the trademark STEP-LOC has become a very important alternative to the conventional system using the so-called tackless strips and requiring stretching of the carpet from wall to wall. As disclosed in the applicant's copending application Ser. No. 243,606, and the applicant's U.S. Pat. Nos. 4,797,170 and 4,557,774, a carpet cushion having the required thickness, density and compressibility may be pre-coated on either one or both sides with a pressure sensitive adhesive. The adhesive may be a water based pressure sensitive adhesive, such as an acrylic adhesive, or it may be a hot melt pressure sensitive adhesive, the latter being particularly advantageous for use on cushion materials which are highly porous but are not sealed. As further disclosed in the patents and the copending application, the cushion may employ a scrim webbing to improve dimensional stability.

The disclosures of Pat. Nos. 4,557,774 and 4,797,170, as well as the disclosure of copending application Ser. No. 243,606, are incorporated herein by reference.

Pat. No. 4,797,170 in particular discloses a wall-to-wall carpeting system involving a carpet cushion having pressure sensitive adhesive on only one surface of the cushion. Such a one-sided adhesive carpet cushion can be used to adhere the cushion to the floor, with additional adhesive used on the job to adhere the carpet down to the top surface of the cushion; or it can be used in the reverse orientation, with on the job adhesive to secure the cushion to the floor and the preapplied pressure sensitive adhesive of the cushion used to secure the carpet backing down against the top surface of the carpet cushion. The one-sided system has the versatility of being adaptable to either manner of use.

However, an aggressively tacky pressure sensitive adhesive, of the type which is preferred for use in a tackless, stretchless adhesive carpet cushion system as in the present invention, will sometimes adhere strongly to the non-adhesive coated opposite surface in roll storage, particularly if the cushion is rolled very tightly or in the event a compressive load is pushed against the roll. Such loading often occurs when a heavy load of additional cushion rolls or carpeting or other inventory is placed over a rolled adhesive carpet cushion. When the layers are pulled apart on unrolling of the cushion, damage can occur to an unprotected cushion surface.

In Pat. No. 4,797,170, the subject of rolled storage and transport of the carpet cushion was discussed. It was disclosed that a release film should be placed over the adhesive surface before rolling the cushion into a storage roll, with one function being to prevent the adhesive side from sticking strongly to the non-adhesive side. Of course, a release film is ordinarily needed if the one-sided adhesive cushion is to be installed with the adhesive side up, for engagement with the carpet backing.

SUMMARY OF THE INVENTION

In accordance with the present invention, a tackless, stretchless adhesive carpet cushion is formed of any suitable compressible material such as urethane foam, rebonded urethane scraps, natural fibers or felt material, which may include scrap material formed into a cushion. The cushion has a pressure sensitive adhesive pre-coated on only one side. The adhesive side of the cushion normally is the side which will be adhered down to a floor, such that additional adhesive can be applied on the job to adhere the wall-to-wall carpet down to the top surface of the cushion.

In the manufacturing process a scrim webbing or other spacer element, which may take any of several forms, is laid into the pressure sensitive adhesive after the adhesive has been applied to the cushion surface. It is important that the spacer element be added after application of the adhesive. The spacer element, as laid into the pre-applied pressure sensitive adhesive, remains adhered to the cushion essentially without any adhesive on the outer side of the spacer element, i.e. the side facing away from the cushion. In this way, the spacer element enables the movement of the carpet cushion around on a floor for positioning prior to sticking down to the floor. The cushion does not become fixed to the floor until a deliberate weight (such as of a person walking) is applied to push the adhesive coated surface down against the floor.

An important further benefit of the scrim webbing or spacer element laid into the pre-applied adhesive is in the rolling of the cushion into a relatively tight spiral roll for storage and shipment. The spacer element on the adhesive layer enables the cushion to be rolled without the use of any release film between the rolled layers, particularly in the case of aggressively tacky pressure sensitive adhesive which otherwise, as discussed above, might tack too tightly to an opposed surface in the roll. Even without any surface sealant, surface crust or other surface hardening or protection on the non-adhesive side, the scrim webbing keeps the tacky adhesive from bonding to any significant degree to the other surface and from causing any damage to the other surface when the adhesive cushion is unrolled for use.

In one preferred embodiment of the invention, the spacer element is a scrim webbing whose filament size may be in the range of about 0.010 inch to 0.030 inch (preferably 0.015 inch), and whose grid may be square or rectangular and in the range of about 9/64 inch to ⅜ inch opening size (preferably ¼ inch opening size). Such a scrim webbing has been found very effective, even in the small filament sizes and relatively large opening sizes referenced above, in accomplishing the purposes of the invention. Such a scrim webbing also has the additional benefit of adding dimensional stability to the adhesive carpet cushion, and enabling the cushion to be later removed from the floor essentially in whole form, substantially without leaving patches of adhesive and cushion adhered to the floor.

A further form of spacer element which may be used in another embodiment of the invention is a series of independent, parallel filaments applied against the adhesive during manufacturing, from roll stock. A spacer element in this form provides the benefit of holding the adhesive cushion surface from strongly bonding to the floor prematurely or to the non-coated opposite cushion surface in roll storage, and it further provides some benefit in the later removal of the carpet cushion from the floor, although the latter benefit is not as significant as in the case of the scrim webbing. The parallel filaments also have the advantage of lower cost, both in materials and in assembly.

Other forms of spacer elements may also be used in addition to those examples described above. The important concerns are that the spacer elements be of a nature which will adhere well to the pressure sensitive adhesive on the carpet cushion surface, without a tendency to easily be pulled or brushed or scraped off the surface; that the spacer element be of an adequate thickness and adequately close spacing to tend to hold the tacky surface away from adhesion to other surfaces except when deliberate pressure is applied; and that the spacer element be of reasonable cost so as to preserve the cost efficiency of the adhesive carpet cushion and the wall-to-wall carpet laying system involving the adhesive cushion.

It is therefore among the objects of the present invention to improve the one-sided pressure sensitive adhesive carpet cushion disclosed in U.S. Pat. No. 4,797,170, to improve certain aspects of the applicant's system of laying wall-to-wall carpet without stretching, and particularly to improve the efficiency and economy of manufacturing, storing and using a one-sided adhesive carpet cushion. These and other objects, advantages and features of the invention will be apparent from the following description of preferred embodiments, considered along with the accompanying drawings.

DESCRIPTION OF THE DRAWINGS

FIG. 1 is a perspective view showing a roll of carpet cushion material formed in accordance with the present invention.

FIG. 2 is a sectional elevation view, not necessarily in proper proportion, showing the construction of the carpet cushion of FIG. 1.

FIG. 3 is a plan view showing a portion of one embodiment of the carpet cushion of the invention, with a scrim webbing on one surface.

FIG. 4 is another plan view similar to FIG. 3, but showing another embodiment of the invention.

FIG. 5 is a schematic representation of a process which can be used to produce an adhesive carpet cushion of the type shown in FIG. 4.

DESCRIPTION OF PREFERRED EMBODIMENTS

In the drawings, FIG. 1 shows a carpet cushion 10 in accordance with the principles of the present invention, rolled in the conventional manner for storage and transport.

The carpet cushion 10 is of sufficient thickness, density and compressibility to enable it to serve as a carpet cushion, in the conventional sense as used in wall-to-wall carpeting. Thickness normally is in the range of about ¼ inch to about ⅝ inch. In rare cases, a cushion of only ⅛ inch thickness may be desired (generally of rubber rather than synthetic materials and high in density). For density, in the case of rebonded urethane foam material, for example, density can typically range from about 5 pounds per square yard to about 14 pounds per square yard, for ¼ inch thickness. "Density" in the carpet pad industry generally means weight per square yard, rather than per unit of volume. In general, thinner cushions are made more dense in the true sense of the word, so that some cushioning is still provided. Density, thickness and compressibility are thus interrelated. Rubber cushion densities are usually higher than typical urethane foam or rebonded urethane padding. "Densified urethane" is considerably denser than typical urethane, and may be 14 to 18 pounds per square yard for a cushion only 0.182 inch thick. High-density, thin cushions usually are employed in highly trafficked commercial areas.

The carpet cushion 10 has a coating of pressure sensitive adhesive 12 on one side, preferably the side 14 which will be the outer surface of the carpet cushion in the roll. The outer surface of the roll is then wrapped with a release coating or plastic bag. The adhesive coating can be on the opposite side 16 if desired, but it is preferred that it be on the outer surface so that it can be unrolled onto a floor upon installation (for the preferred adhesive side down type of installation).

Also visible in FIG. 1 and FIG. 2 is a spacer member or spacer element 18 which is laid against the pressure sensitive adhesive coating 12 after the coating has been applied. The spacer element 18 shown in the preferred embodiment of FIG. 1 is a scrim webbing formed of a grid of filaments, preferably of plastic material such as polyethylene, nylon, etc., and is assembled onto the pre-applied adhesive such that only the inner side of the scrim webbing or grid contacts the adhesive. The outer side 20 of the spacer element or grid is free of adhesive, and thus the spacer element acts to partially hold the adhesive off from a surface contacted by the spacer element, until deliberate pressure is applied to bond the adhesive coated cushion to the surface as intended for installation.

Thus, the rolled carpet cushion 10 of the invention, with pressure sensitive adhesive on one side 14, is without any release film between the adhesive coated surface 14 and the opposite, uncoated cushion surface 16. The spacer member holds the precoated adhesive 12 away from the opposite surface 16 to a degree sufficient to prevent any significant adhesive bonding of the two surfaces 14 and 16, even if the rolled cushion 10 is subjected to squeezing pressures such as when stored in a large mass of similar cushion rolls or carpet supplies. The avoidance of the need for a release sheet is an important feature of the present invention.

FIG. 2 shows the carpet cushion 10 and one preferred embodiment of the invention, in cross-section, as constructed of a plurality of layers. FIGS. 3 and 4 show alternate embodiments of the invention, with two different forms of spacer element applied to the pressure sensitive adhesive.

The carpet cushion may be comprised of a cushioning material 24 such as a urethane foam, rebonded urethane foam scraps, or other natural or synthetic materials. It can comprise felt, synthetic felted materials, a suitable compressible foam coated with a remay layer, rubber, or other suitable compressible materials. Any of the materials referred to in copending application Ser. No. 243,606 may be used as the basic cushioning material 24, as well as other suitable materials.

Also as disclosed in that copending application, the surface of the cushioning material 24 (or of a remay layer bonded to it) may be completely unsealed and highly porous. In that case, a hot melt pressure sensitive adhesive may be applied onto the porous surface, such as by spraying. As disclosed in the copending application, the hot melt pressure sensitive adhesive will substantially set up and enter a non-flowable state as soon as it strikes the surface of the cushioning material (while still being distributed adequately on the surface), so that it does not wick into the porous material to any significant or objectionable extent. This is in contrast to the use of a water-based pressure sensitive adhesive of which a great deal would wick into a porous material such as to be practically non-feasible.

If a water-based pressure sensitive adhesive is used, alternate means for preventing wicking in may be employed, as described in U.S. Pat. Nos. 4,557,774 and 4,797,170. These may include a substantially impenetrable crust formed on the cushion surface before adhesive application, in the case of a synthetic foam, or a sprayed-on surface sealant, or a thin sealing film on the surface. To such a sealed surface the water-based pressure sensitive adhesive is applied; then the scrim webbing (or other spacer member) is laid against the tacky pressure sensitive adhesive so as to bond it tightly to the cushion. Of course, a hot melt pressure sensitive adhesive may be used on a sealed surface, if desired.

FIG. 3 shows the scrim webbing 18 as the spacer element, as illustrated in FIGS. 1 and 2 and as described above. The filament sizes and opening sizes for such a scrim webbing, for preferred embodiments of the invention, are described above. The disclosed ranges assume a tackiness in the range of about 5 to 20 pounds per square inch after pressure is applied, preferably about 10 to 16 p.s.i.

FIG. 4 shows an alternative embodiment of the present invention wherein an adhesive carpet cushion 10a has one side 14 precoated with a pressure sensitive adhesive 12, and with a different form of spacer element 26 assembled onto the adhesive surface. In this embodiment, the spacer member or element 26 comprises a series of spaced, parallel filaments which serve substantially the same purposes as the scrim webbing 18 described previously. In one preferred embodiment, the filaments 26 are at a spacing of ¼ inch and have a filament thickness in the range of 0.010 inch to 0.030 inch. Again, this assumes a surface tackiness from the adhesive 12 in the range of about 5 to 20 p.s.i. and more preferably in the range of about 10 to 16 p.s.i.

FIG. 5 shows schematically a process for producing an adhesive, one-sided carpet cushion of the type shown in FIG. 4. The cushion material comes from a roll 30, and is led past a series of sprayers 32 which apply the pressure sensitive adhesive (hot melt pressure sensitive adhesive in the event the surface 14 is porous and unsealed). After the pressure sensitive adhesive has essentially reached its final state of tackiness and hardness, the series of filaments 26 comprising the spacer element are fed from one or more rolls 34 and into contact with the applied adhesive, in spaced parallel relationship as shown.

The manufactured product is taken up into a roll 36, as shown, without the need of any release film or strip between the adhesive side 14 and the opposite side 16.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A carpet cushion for use in securing a wall-to-wall carpet to a floor with the cushion between the carpet and the floor, comprising, a carpet cushion of compressible material suitable for cushioning a wall-to-wall carpet, and being of such thickness, density and compressibility as to serve as a wall-to-wall carpet cushion, the carpet cushion having preapplied to only one side, a pressure sensitive adhesive of suitable tackiness to securely bond the carpet cushion to a floor after being pressed against the floor, in such a way as to hold the cushion against the floor substantially permanently, the carpet cushion further having applied against the adhesive a spacer means distributed substantially evenly over the adhesive, for partially holding the adhesive coated surface of the carpet cushion away from a surface unless and until the carpet cushion is deliberately pressed into tight engagement with the surface, the spacer means having one side engaged with the adhesive and having an outer side substantially free of adhesive, and the carpet cushion being stored in rolled form, without any release sheet between the adhesive coated surface and the opposed, uncoated carpet cushion surface in contact with the spacer means.

2. A carpet cushion according to claim 1, wherein the spacer means comprises a scrim webbing formed of a grid of intersecting filaments.

3. A carpet cushion according to claim 2, wherein the filaments of the grid have a filament diameter in the range of 0.010 inch ton 0.030 inch, and a grid spacing in the range of about 9/64 inch to ⅜ inch.

4. A carpet cushion according to claim 3, wherein the grid spacing is about ¼ inch.

5. A carpet cushion according to claim 1, wherein the spacer means comprises a series of parallel, spaced filaments running along the length of the carpet cushion.

6. A carpet cushion according to claim 5, wherein the filaments have a filament diameter in the range of about 0.010 inch to 0.030 inch, and a spacing from filament to filament of about ¼ inch.

7. A carpet cushion according to claim 6, wherein the preapplied pressure sensitive adhesive has a bonding strength in the range of about 5 to 20 pounds per square inch.

8. A carpet cushion according to claim 7, wherein the pressure sensitive adhesive has a bonding strength in the range of about 10 to 16 pounds per square inch.

9. A carpet cushion according to claim 1, wherein the preapplied pressure sensitive adhesive has a bonding strength in the range of about 5 to 20 pounds per square inch.

10. A carpet cushion according to claim 9, wherein the pressure sensitive adhesive has a bonding strength in the range of about 10 to 16 pounds per square inch.

* * * * *